(12) United States Patent
Sehgal

(10) Patent No.: US 7,617,180 B1
(45) Date of Patent: Nov. 10, 2009

(54) EFFICIENT LOCK MANAGEMENT

(75) Inventor: Ashish Sehgal, Sunnyvale, CA (US)

(73) Assignee: Infoblox Inc., Santa Clara, CA (US)

( * ) Notice: Subject to any disclaimer, the term of this patent is extended or adjusted under 35 U.S.C. 154(b) by 367 days.

(21) Appl. No.: 11/146,296

(22) Filed: Jun. 6, 2005

(51) Int. Cl.
*G06F 17/30* (2006.01)
*G06F 9/46* (2006.01)

(52) U.S. Cl. .......................................... 707/2; 718/101

(58) Field of Classification Search ........................ None
See application file for complete search history.

(56) References Cited

U.S. PATENT DOCUMENTS

| | | | |
|---|---|---|---|
| 5,247,672 A * | 9/1993 | Mohan ........................ 711/152 |
| 5,327,556 A * | 7/1994 | Mohan et al. ................... 707/8 |
| 5,455,944 A * | 10/1995 | Haderle et al. ............... 707/202 |
| 5,455,946 A * | 10/1995 | Mohan et al. ................ 707/202 |
| 5,465,328 A * | 11/1995 | Dievendorff et al. .......... 714/15 |
| 5,778,388 A * | 7/1998 | Kawamura et al. .......... 707/203 |
| 5,864,849 A * | 1/1999 | Bohannon et al. .............. 707/8 |
| 5,872,981 A * | 2/1999 | Waddington et al. ........ 710/200 |
| 5,960,194 A * | 9/1999 | Choy et al. ................. 707/102 |
| 5,960,436 A * | 9/1999 | Chang et al. ................ 707/101 |
| 6,694,340 B1 * | 2/2004 | Lyle et al. ................... 707/204 |
| 6,772,154 B1 * | 8/2004 | Daynes et al. .................. 707/8 |
| 7,051,028 B2 * | 5/2006 | Shi et al. ........................ 707/9 |
| 7,236,974 B2 * | 6/2007 | Bhattacharjee et al. ......... 707/8 |
| 7,290,056 B1 * | 10/2007 | McLaughlin, Jr. .......... 709/230 |
| 7,395,382 B1 * | 7/2008 | Moir .......................... 711/147 |
| 2002/0065968 A1 * | 5/2002 | Bryant et al. ............... 710/200 |
| 2002/0152123 A1 * | 10/2002 | Giordano et al. ............. 705/14 |
| 2004/0068501 A1 * | 4/2004 | McGoveran ................... 707/8 |
| 2004/0205066 A1 * | 10/2004 | Bhattacharjee et al. ......... 707/8 |
| 2005/0033720 A1 * | 2/2005 | Verma et al. ................... 707/1 |
| 2007/0174185 A1 * | 7/2007 | McGoveran ................. 705/39 |
| 2007/0233683 A1 * | 10/2007 | Verma et al. ................... 707/8 |

OTHER PUBLICATIONS

Jorge Matinez, Matias Alvarado, "Concurrency Control Monotor for Nested Transaction Based on Autonomous Agents", Jul. 27, 2002.*
Altibase, High Performance Main Memory DBMS.
Oracle, Technical Comparison of Oracle, Database vs. IBM DB2 UDB: Focus on Performance, An Oracle White Paper, May 2005.

* cited by examiner

*Primary Examiner*—Neveen Abel Jalil
*Assistant Examiner*—Tarek Chbouki
(74) *Attorney, Agent, or Firm*—Van Pelt, Yi & James LLP

(57) ABSTRACT

A current transaction accessing a data object is disclosed. Accessing could include determining that previous transaction information about a previous transaction is associated with the data object, determining that the previous transaction no longer needs a lock on the data object, and associating current transaction information about the current transaction with the data object. Accessing could include determining that an embedded lock is active, copying the embedded lock to a shared lock region, invalidating the embedded lock, and queuing the current transaction in the shared lock region.

20 Claims, 3 Drawing Sheets

EFFICIENT LOCK MANAGEMENT

BACKGROUND OF THE INVENTION

Databases store data as items in structures, such as directory based trees or relational tables. Transactions are typically processed using a two phase locking approach, in which a lock is acquired on an item at the start of a transaction and released at the end of the transaction (when the transaction is committed). This allows concurrent access to various objects in the database. Typically, locks are maintained in a shared lock region, which frequently must be accessed. For example, each time a lock is acquired or released, the shared lock region is updated. Accessing the shared lock region too frequently can become expensive. In addition, too many locks can lead to lock overflow. A more efficient way of acquiring and releasing locks is needed. In particular, a solution that improves the efficiency of finer granularity locking and improves the throughput of write transactions would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A current transaction accessing a data object is disclosed. In some embodiments, an embedded lock is associated with a previous transaction. If the previous transaction is no longer locking the data object, then the embedded lock is associated with the current transaction. If the previous transaction is still locking the data object, the embedded lock is unembedded, and the current transaction is queued in the shared lock region.

Figure 1:
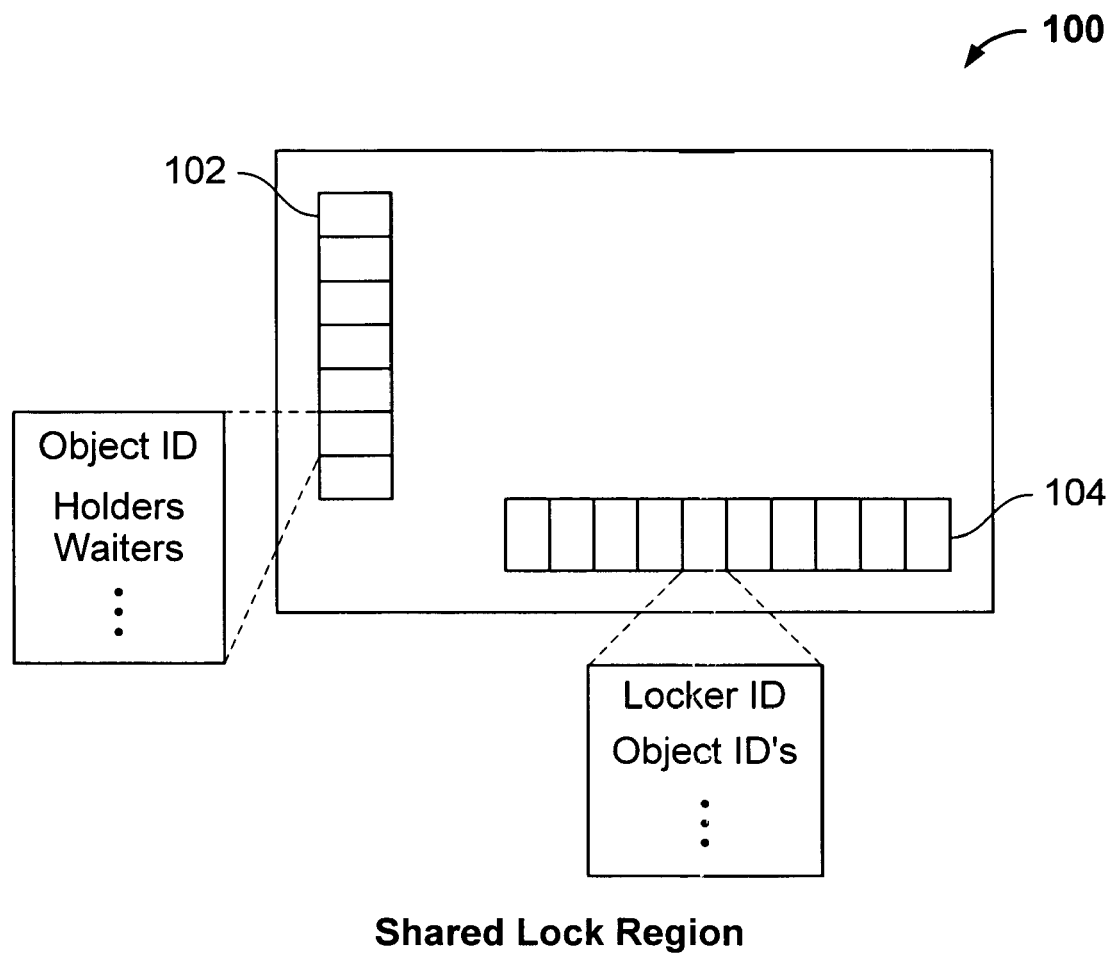
FIG. 1 illustrates an embodiment of a shared lock region.

FIG. 1 illustrates an embodiment of a shared lock region. In the example shown, shared lock region 100 includes object list 102 and locker list 104. Shared lock region 100 could be located in shared memory, memory mapped files, or any other appropriate location.

Object list 102 is a list of all objects having at least one lock. (As used herein, object and data object are used interchangeably.) Each item in object list 102 includes an object ID and a list of holders and waiters. The list of holders is a list of transactions with locks on the object having that object ID. The list of waiters is a list of transactions waiting for locks on the object with that object ID. In some embodiments, an item in object list 102 is accessed using a hash. For example, the location of the item in object list 102 is the hash of the object ID.

Locker list 104 is a list of all active lockers. Each item in locker list 104 includes a locker ID and a list of object IDs. The list of object IDs is a list of objects held by transactions having that locker ID. The locker ID can also be referred to as a transaction ID when an associated transaction is taking place.

Figure 2:
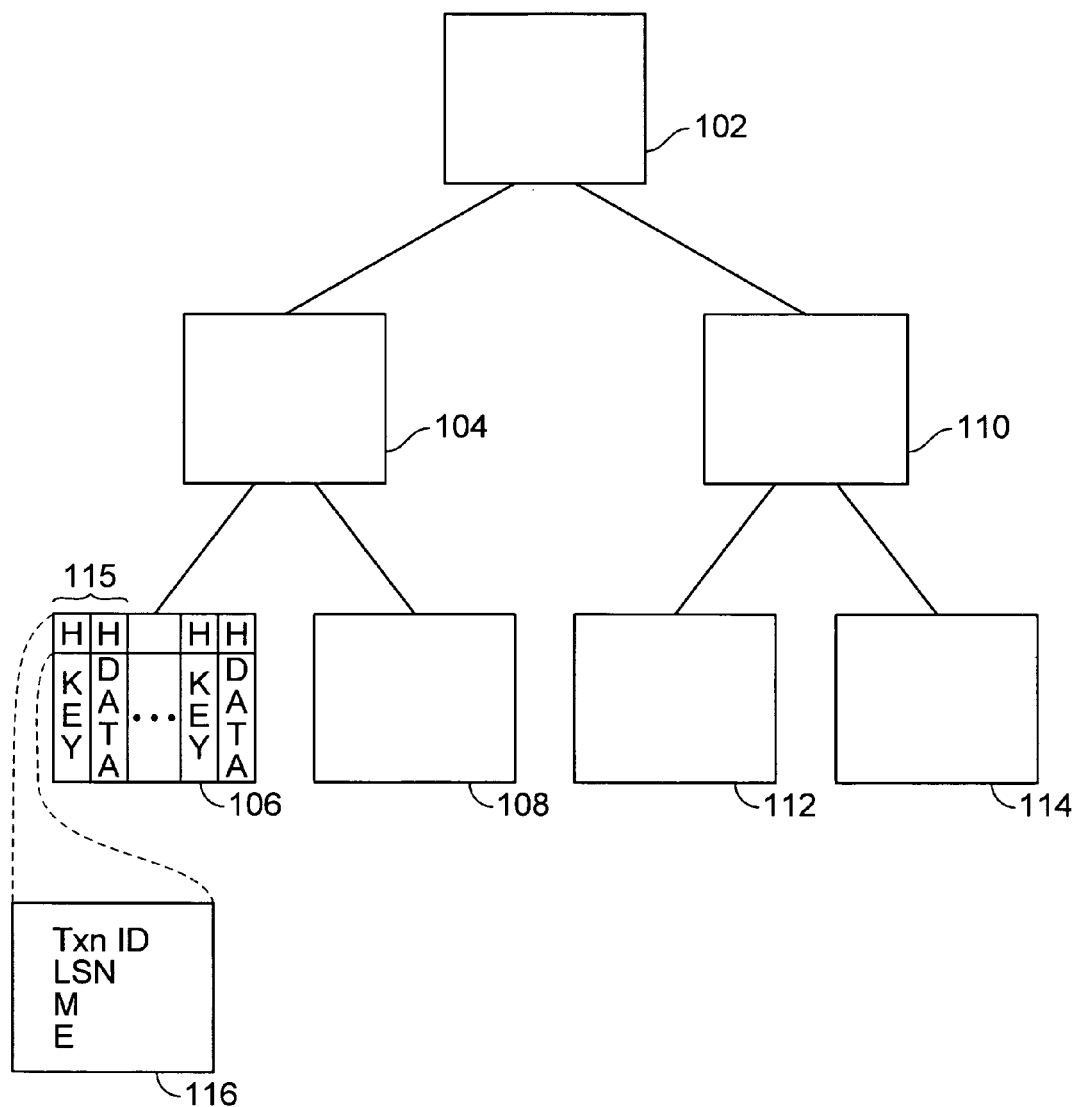
FIG. 2 is a diagram illustrating a directory based index of a database.

FIG. 2 is a diagram illustrating a directory based index of a database. In this example, the index takes the form of a binary tree (btree), in which each node has one parent node and two child nodes (except for root and leaf nodes). Each node 102-114 represents an item (or record) in the database. Each item includes a set of data objects, where each data object includes a key associated with data. Each key includes a key header. The key header can include embedded locking information such as previous transaction information associated with the data object. For example, item 106 includes data object 115. Key header 116 in object 115 includes the following values: TxnID, LSN, and a set of flags. The set of flags includes M and E. TxnID is the transaction ID of the transaction that last accessed this key.

The LSN (log sequence number) is the begin LSN of the transaction that last accessed this key. A transaction can include one or more operations, each of which is recorded in a log as a log record. The LSN associated with a log record represents the location in the log where the record is located. The LSN is discussed more fully in co-pending U.S. patent application Ser. No. 10/901,020 entitled MULTIVERSION CONCURRENCY CONTROL filed Jul. 27, 2004, which is incorporated herein by reference for all purposes. In the set of flags, M is the mode of the lock (e.g., shared, exclusive, etc). In some embodiments, there are 12-14 modes available. E is an indicator of whether a lock is embedded or not. When E=1, a lock is embedded. When E=1, the fields TxnID, LSN, and Mode are valid. When E=0, a lock is not embedded. When E=0, the fields TxnID, LSN, and Mode are invalid. In some embodiments, they are set to 0. In some embodiments, the set of flags includes 32 bits, out of which four bits describe the lock mode (M) and another bit describes whether the lock is embedded (E). M and E can be stored as flags or in any other appropriate way in various embodiments.

Figure 3:
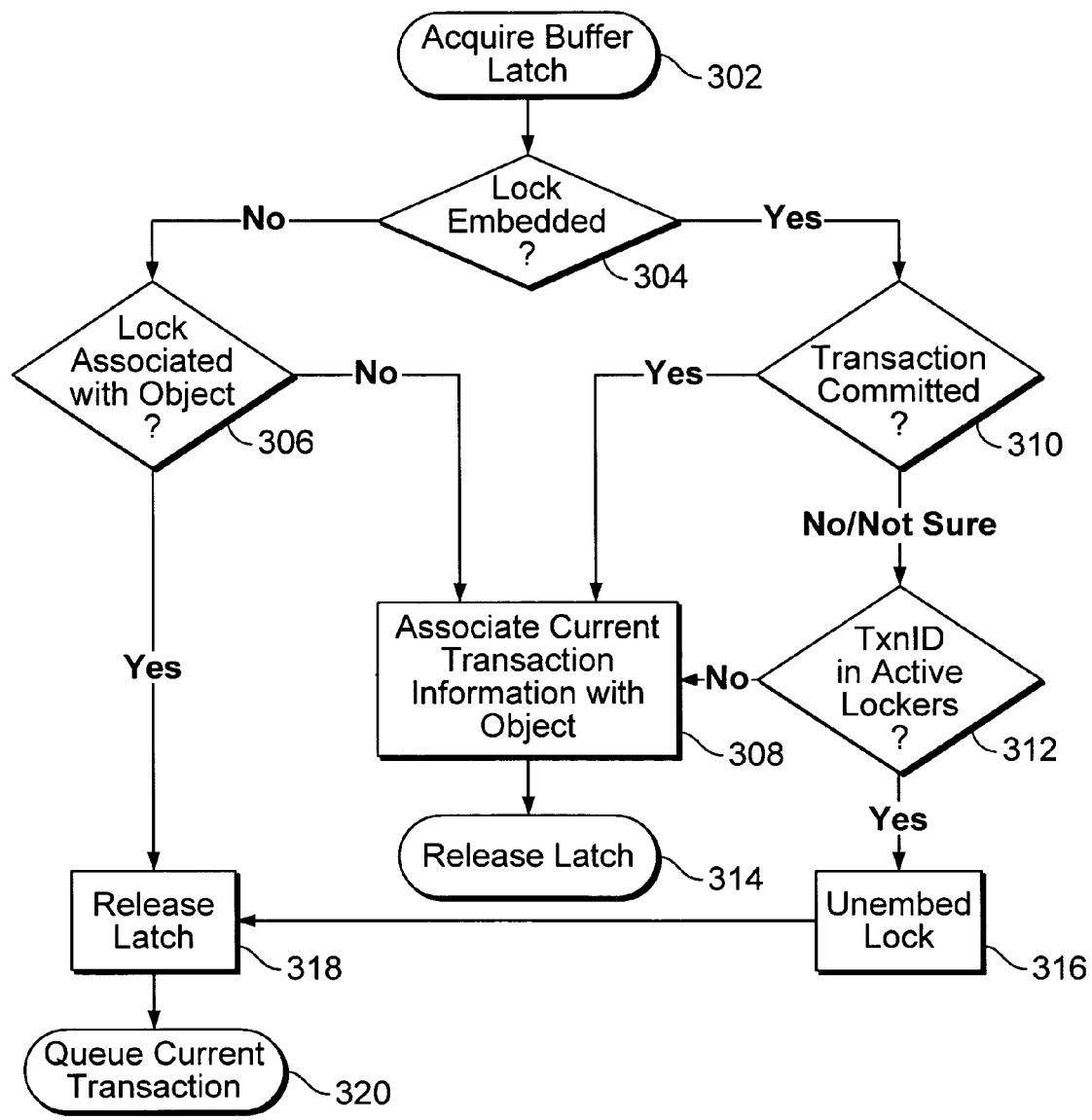
FIG. 3 illustrates an embodiment of a process of requesting a lock.

FIG. 3 illustrates an embodiment of a process of requesting a lock. In this example, a current transaction requests a lock on a data object. In the example shown, the process begins at 302. A buffer latch is acquired. The buffer that contains the page that the transaction is accessing includes a buffer latch. The buffer latch is a mutex or mutual exclusion lock. The buffer latch exclusively locks the embedded locking information so that it can be updated.

At 304, it is determined whether an embedded lock on the data object is active. In other words, it is determined whether E=1. If E=1, locking information is embedded in the key (e.g., the key header). The locking information includes previous transaction information associated with the data object. At 310, it is determined whether the previous transaction associated with the locking information is committed as of the start of the current transaction. In some embodiments, this can be performed based on a snapshot (of all active writers) that was acquired at the start of the current transaction, as more fully described in U.S. patent application Ser. No. 10/901,020, which was previously incorporated by reference. If the transaction is committed, then the previous transaction is no longer locking the data object. At 308, the current transaction information is associated with the data object. For example, the Txnid, LSN, and M fields in the key header are replaced with the information corresponding to the current transaction. At 314, the buffer latch acquired at 302 is released.

At 310, if the previous transaction whose locking information appears on the key header is not committed (or it is uncertain whether it is committed) as of the start of the current transaction, then the previous transaction could still be locking the data object. At 312, it is determined whether the TxnID exists in the active lockers. For example, the shared lock region is locked, and it is determined whether the TxnID is in the list of active lockers (e.g., locker list 104). If the TxnID is not in the list of active lockers, then the transaction whose locking information appears on the key header is committed as of the start of the current transaction. At 308, the current transaction information is associated with the data object. For example, the Txnid, LSN, and M fields in the key header are replaced with the information corresponding to the current transaction. At 314, the buffer latch acquired at 302 is released.

At 312, if the TxnID is in the list of active lockers, then the previous transaction whose locking information appears on the key header is active in the shared lock region. In other words, the previous transaction is still locking the data object. At 316, the lock is unembedded. In some embodiments, unembedding the lock includes copying (or placing) the embedded lock to the shared lock region and invalidating the embedded lock. For example, the lock information in the key header is placed in the shared lock region. The embedded lock is invalidated. For example, the E field in the key header is set to 0. In some embodiments, the TxnID, LSN, and M fields in the key header are also set to 0. At 318, the buffer latch acquired at 302 is released. At 320, the lock request by the current transaction is queued in the shared lock region.

At 304, if E=0, a lock is not embedded. At 306, it is determined whether a lock is associated with the object. For example, in the shared lock region, the item in the object list (e.g., list 102) corresponding to the object ID is accessed. If the item does not include any transactions listed for that object ID, then no other transaction is locking or waiting to acquire a lock on this key. At 308, the current transaction information is associated with the data object. In other words, the current transaction acquires an embedded lock on the object. For example, the Txnid, LSN, and M fields on the key header are replaced with the information corresponding to the current transaction. E is set to 1 to indicate that the lock is embedded. At 314, the buffer latch acquired at 302 is released.

At 306, if the object list indicates that the object ID is either locked by other transaction(s) or being waited upon by other transaction(s), then the buffer latch acquired at 302 is released at 318. At 320, the lock request by the current transaction is queued in the shared lock region.

When a transaction commits or aborts, it gives up the locks it holds in the shared memory region. The transaction does not need to embed or unembed the lock information. The lock can be viewed as being implicitly released. In addition, there is no need to specially handle deadlocks.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of a current transaction accessing a data object, including:
   determining whether an embedded lock on the data object is active based at least in part on locking information embedded in the data object, wherein the locking information includes previous transaction information about a previous transaction associated with the data object;
   in the event that an embedded lock on the data object is active:
   determining whether a previous transaction associated with the locking information is committed as of the start of the current transaction;
   and in the event that the previous transaction associated with the locking information is not committed as of the start of the current transaction:
   determining whether the previous transaction has a lock on the data object;
   in the event that the previous transaction does not have a lock on the data object, embedding current transaction information in the data object;
   and in the event that the previous transaction does have a lock on the data object, placing the embedded lock in a shared lock region and invalidating the embedded lock;
   and in the event that an embedded lock on the data object is not active, determining whether a lock is associated with the data object, including by:
   accessing, in an object list in a shared lock region, an item corresponding to the data object;
   determining whether the item includes any transactions;
   in the event that the item includes a transaction, determining that a lock is associated with the data object and queuing the lock in the shared lock region;
   and in the event that the item does not include any transactions, determining that a lock is not associated with the data object and embedding current transaction information in the data object.

2. A method as recited in claim 1, further including completing the previous transaction without releasing the lock.

3. A method as recited in claim 1, wherein determining that the previous transaction no longer needs a lock on the data object includes determining that the previous transaction is complete.

4. A method as recited in claim 1, further including acquiring a buffer latch associated with the data object.

5. A method as recited in claim 1, wherein the previous transaction information includes a transaction ID or a log sequence number.

6. A method as recited in claim 1, wherein the current transaction information includes a transaction ID or a log sequence number.

7. A method as recited in claim 1, wherein determining that the previous transaction is no longer locking the data object is based on a transaction ID or a log sequence number.

8. A method as recited in claim 1, wherein the previous transaction information is stored in a header associated with the data object.

9. A method as recited in claim 1, wherein associating includes storing the current transaction information in a header associated with the data object.

10. A method as recited in claim 1, wherein determining that previous transaction information about a previous transaction is associated with the data object includes checking an indicator of whether a lock on the data object is embedded.

11. A method as recited in claim 1, wherein determining that the previous transaction is no longer locking the data object includes checking a snapshot that was acquired at the start of the current transaction.

12. A method as recited in claim 1, wherein determining that the previous transaction is no longer locking the data object includes checking a shared lock region.

13. A method as recited in claim 1, wherein the locking information embedded in the data object is in a header in the data object.

14. A method as recited in claim 1, wherein embedding current transaction information in the data object includes writing the current transaction information to a header in the data object.

15. A method as recited in claim 1,
wherein the shared lock region includes a list of all objects having at least one lock.

16. A method as recited in claim 1, further including, in the event that the previous transaction associated with the locking information is committed as of the start of the current transaction, embedding current transaction information in the data object.

17. A system for a current transaction accessing a data object, including:
a processor configured to:
determine whether an embedded lock on the data object is active based at least in part on locking information embedded in the data object, wherein the locking information includes-previous transaction information about a previous transaction associated with the data object;
in the event that an embedded lock on the data object is active:
determine whether a previous transaction associated with the locking information is committed as of the start of the current transaction;
and in the event that the previous transaction associated with the locking information is not committed as of the start of the current transaction:
determine whether the previous transaction has a lock on the data object;
in the event that the previous transaction does not have a lock on the data object, embed current transaction information in the data object;
and in the event that the previous transaction does have a lock on the data object, place the embedded lock in a shared lock region and invalidate the embedded lock;
and in the event that an embedded lock on the data object is not active, determining whether a lock is associated with the data object, including by: accessing in an object list in a shared lock region an item corresponding to the data object; determining whether the item includes any transactions;
in the event that the item includes a transaction, determining that a lock is associated with the data object and queuing the lock in the shared lock region;
and in the event that the item does not include any transactions, determining that a lock is not associated with the data object and embedding current transaction information in the data object;
and a memory coupled with the processor wherein the memory provides the processor with instructions.

18. A system as recited in claim 17, wherein the processor is further configured to complete the previous transaction without releasing the lock.

19. A computer program product for a current transaction accessing a data object, the computer program product being embodied in a computer readable medium and comprising computer instructions for:
determining whether an embedded lock on the data object is active based at least in part on locking information embedded in the data object, wherein the locking information includes previous transaction information about a previous transaction associated with the data object;
in the event that an embedded lock on the data object is active:
determining whether a previous transaction associated with the locking information is committed as of the start of the current transaction;
and in the event that the previous transaction associated with the locking information is not committed as of the start of the current transaction:
determining whether the previous transaction has a lock on the data object;
in the event that the previous transaction does not have a lock on the data object, embedding current transaction information in the data object;
and in the event that the previous transaction does have a lock on the data object, placing the embedded lock in a shared lock region and invalidating the embedded lock;
and in the event that an embedded lock on the data object is not active, determining whether a lock is associated with the data object, including by:
accessing, in an object list in a shared lock region, an item corresponding to the data object;
determining whether the item includes any transactions;
in the event that the item includes a transaction, determining that a lock is associated with the data object and queuing the lock in the shared lock region;
and in the event that the item does not include any transactions, determining that a lock is not associated with the data object and embedding current transaction information in the data object.

20. A computer program product as recited in claim 19, the computer program product further comprising computer instructions for completing the previous transaction without releasing the lock.

* * * * *

UNITED STATES PATENT AND TRADEMARK OFFICE
CERTIFICATE OF CORRECTION

PATENT NO.         : 7,617,180 B1
APPLICATION NO.    : 11/146296
DATED              : November 10, 2009
INVENTOR(S)        : Ashish Sehgal Page 1 of 1

It is certified that error appears in the above-identified patent and that said Letters Patent is hereby corrected as shown below:

Column 6, Claim 17, Line 1:
add --,-- after region
Column 6, Claim 17, Line 11:
add --,-- after processor Signed and Sealed this
First Day of January, 2013

David J. Kappos
*Director of the United States Patent and Trademark Office*